US009715858B2

(12) United States Patent
Kwak et al.

(10) Patent No.: US 9,715,858 B2
(45) Date of Patent: Jul. 25, 2017

(54) DISPLAY APPARATUS AND METHOD OF DRIVING THEREOF

(71) Applicant: Samsung Display Co., LTD., Yongin, Gyeonggi-Do (KR)

(72) Inventors: Tong-Ill Kwak, Cheonan-si (KR); Ji-Hye Kwon, Jeonju-si (KR); Min-Su Son, Busan (KR); Yong-Oh Eom, Seoul (KR); Woon-Yong Lim, Busan (KR); Ki-Hyun Pyun, Goyang-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 343 days.

(21) Appl. No.: 14/322,151

(22) Filed: Jul. 2, 2014

(65) Prior Publication Data

US 2015/0145844 A1 May 28, 2015

(30) Foreign Application Priority Data

Nov. 22, 2013 (KR) ........................ 10-2013-0143235

(51) Int. Cl.
*G06F 1/00* (2006.01)
*G09G 3/36* (2006.01)

(52) U.S. Cl.
CPC ......... *G09G 3/3614* (2013.01); *G09G 3/3688* (2013.01); *G09G 2320/0209* (2013.01); *G09G 2330/06* (2013.01)

(58) Field of Classification Search
CPC .......... G09G 5/00; G09G 3/36; G09G 3/3648; G09G 3/3614; G09G 3/3233; G09G 2330/021
See application file for complete search history.

(56) References Cited

U.S. PATENT DOCUMENTS 7,821,512 B2 10/2010 Yi
7,859,496 B2 * 12/2010 Kim .................. G02F 1/136286 345/100
2008/0001890 A1 * 1/2008 Song .................... G09G 3/3614 345/96
2010/0265274 A1 * 10/2010 Han ..................... G09G 3/3688 345/690

(Continued)

FOREIGN PATENT DOCUMENTS

KR 1020060001331 A 1/2006
KR 1020060078753 A 7/2006
KR 1020070041219 A 4/2007

(Continued)

*Primary Examiner* — Michael Faragalla
(74) *Attorney, Agent, or Firm* — Cantor Colburn LLP

(57) ABSTRACT

A display apparatus includes a display panel including a plurality of data lines arranged in a first direction, where the data line extends substantially in a second direction, and a plurality of pixels electrically connected to the data lines, and a data driver configured to output a first data voltage and a second data voltage to the data lines and configured to control the number of the data lines which receives the first data voltage and the number of the data lines which receive the second data voltage, where the first data voltage has a positive polarity during a first frame and a negative polarity during a second frame, and the second data voltage has the negative polarity during the first frame and the positive polarity during the second frame.

13 Claims, 8 Drawing Sheets

(56) References Cited

U.S. PATENT DOCUMENTS

2011/0037746 A1 2/2011 Kim et al.

FOREIGN PATENT DOCUMENTS

| | | | |
|---|---|---|---|
| KR | 1020070047529 | A | 5/2007 |
| KR | 1020080025228 | A | 3/2008 |
| KR | 1020090107238 | A | 10/2009 |
| KR | 1020100056318 | A | 5/2010 |
| KR | 1020120118963 | A | 10/2012 |
| KR | 1020130020308 | A | 2/2013 |
| KR | 1020130051773 | A | 5/2013 |

* cited by examiner

DISPLAY APPARATUS AND METHOD OF DRIVING THEREOF

This application claims priority to Korean Patent Application No. 10-2013-0143235, filed on Nov. 22, 2013, and all the benefits accruing therefrom under 35 U.S.C. §119, the content of which is herein incorporated by reference in its entireties.

BACKGROUND

1. Field

Exemplary embodiments of the invention relate to a display apparatus and method of driving the display apparatus. More particularly, exemplary embodiments of the invention relate to a display apparatus with improved display quality and method of driving the display apparatus.

2. Description of the Related Art

A flat panel display ("FPD") may be used as a display apparatus. The FPD may be a relatively large, thin and/or lightweight display device. Examples of the FPD include, but are not limited to, a liquid crystal display ("LCD"), a plasma display panel ("PDP"), and such a display apparatus may include a light emitting diode ("LED") as a light source. Such a display apparatus may be driven based on an inversion method.

SUMMARY

In a display apparatus driven in an inversion method, a ripple signal may occur when data voltages, in which a ratio of a data voltage having a positive polarity to a data voltage having a negative polarity is 1:1, are applied to data lies of the display apparatus. When the ratio is 1:1, a noise of the data voltage having the positive polarity and a noise of the data voltage having the negative polarity may be out of balance. Thus, a ripple noise may occur in a common voltage.

One or more exemplary embodiment of the invention provides a display apparatus with improved display quality by decreasing a ripple noise of a common voltage.

One or more exemplary embodiment of the invention also provides a method of driving the display apparatus.

According to an exemplary embodiment, a display apparatus includes a display panel and a data driver. In such an embodiment, the display panel includes a plurality of data lines arranged in a first direction, where the data line extends substantially in a second direction, and plurality of pixels electrically connected to the data lines, and the data driver is configured to output a first data voltage and a second data voltage to the data lines, and the data driver is configured to control the number of the data lines which receive the first data voltage and the number of the data lines which receive the second data voltage, where the first data voltage has a positive polarity during a first frame and a negative polarity during a second frame, and the second data voltage has the negative polarity during the first frame and the positive polarity during the second frame.

In an exemplary embodiment, the data driver may output alternately the first data voltage and the second data voltage to the data lines.

In an exemplary embodiment, the display apparatus may further include an inversion compensating part configured to output an inversion compensating signal to control a ratio between the number of the data lines which receive the first data voltage and the number of the data lines which receive the second data voltage. The data driver controls the number of the data lines which receive the first data voltage and the number of the data lines which receive the second data voltage in accordance with the inversion compensating signal.

In an exemplary embodiment, the inversion compensating signal may include a data voltage selection signal and a polarity ratio signal. The data voltage selection signal selects one of the first data voltage and the second data voltage, and the polarity ratio signal has a value corresponding to the number of the data lines, a data voltage of which is switched between the first data voltage and the second data voltage.

In an exemplary embodiment, when the data voltage selection signal selects the first data voltage, the data driver decreases the number of the data lines which receive the second data voltage by the value of the polarity ratio signal and increases the number of the data lines which receive the first data voltage by the value of the polarity ratio signal. And when the data voltage selection signal selects the second data voltage, the data driver decreases the number of the data lines which receive the first data voltage by the value of the polarity ratio signal and increases the number of the data lines which receive the second data voltage by the value of the polarity ratio signal.

In an exemplary embodiment, the data driver sequentially switches the first data voltage and the second data voltage therebetween, along the first direction.

In an exemplary embodiment, the data driver non-sequentially switches the first data voltage and the second data voltage therebetween.

In an exemplary embodiment, the display apparatus may further include a common voltage generator configured to output a common voltage to the display panel, and a common voltage detector configured to output a variation of the common voltage, where the inversion compensating part outputs the inversion compensating signal to the data driver based on the variation of the common voltage.

In an exemplary embodiment, the inversion compensating signal may include a data voltage selection signal and a polarity ratio signal. In such an embodiment, when the variation of the common voltage has the negative polarity during the first frame and the positive polarity during the second frame, the data voltage selection signal selects the first data voltage. In such an embodiment, when the variation of the common voltage has the positive polarity during the first frame and the negative polarity during the second frame, the data voltage selection signal selects the second data voltage. In such an embodiment, the polarity ratio signal has a value corresponding to the number of the data lines, a data voltage of which is switched between the first data voltage and the second data voltage, based on the variation of the common voltage.

In an exemplary embodiment, the inversion compensating part outputs the inversion compensating signal to the data driver when the variation of the common voltage is greater than a predetermined threshold.

According to an exemplary embodiment, a method of driving a display apparatus includes outputting a first data voltage and a second data voltage to data lines of the display apparatus using a data driver of the display apparatus, where the second data voltage has a polarity opposite to a polarity of the first data voltage, generating a data voltage selection signal which selects one of the first data voltage and the second data voltage, generating a polarity ratio signal having a value corresponding to the number of data lines, a data voltage of which is switched between the first data voltage and the second data voltage, and controlling the number of the data lines which receive the first data voltage and the number of the data lines which receive the second data voltage based on the data voltage selection signal and the polarity ratio signal.

In an exemplary embodiment, the first data voltage has a positive polarity during a first frame and a negative polarity during a second frame, and the second data voltage has the negative polarity during the first frame and the positive polarity during the second frame.

In an exemplary embodiment, when the data voltage selection signal selects the first data voltage, the data driver decreases the number of the data lines which receive the second data voltage by the value of the polarity ratio signal and increases the number of the data lines which receive the first data voltage by the value of the polarity ratio signal. And when the data voltage selection signal selects the second data voltage, the data driver decreases the number of the data lines which receive the first data voltage by the value of the polarity ratio signal and increases the number of the data lines which receive the second data voltage by the value of the polarity ratio signal.

In an exemplary embodiment, the data driver sequentially switches the first data voltage and the second data voltage along a direction in which the data lines are arranged.

In an exemplary embodiment, the data driver non-sequentially switches the first data voltage and the second data voltage along the direction in which the data lines are arranged.

In an exemplary embodiment, the method of driving a display apparatus may further include outputting a variation of a common voltage, where the common voltage is applied to a display panel of the display apparatus, and the data voltage selection signal and the polarity ratio signal are generated based on the variation of the common voltage.

In an exemplary embodiment, when the variation of the common voltage has the negative polarity during the first frame and the positive polarity during the second frame, the data voltage selection signal may select the first data voltage, and when the variation of the common voltage has the positive polarity during the first frame and the negative polarity during the second frame, the data voltage selection signal may select the second data voltage.

In an exemplary embodiment, the data voltage selection signal and the polarity ratio signal may be generated when the variation of the common voltage is greater than a predetermined threshold.

According to one or more exemplary embodiment of the display apparatus and the method of driving the display apparatus, display quality of the display apparatus may be improved by decreasing a ripple noise of a common voltage.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION

Figure 1:
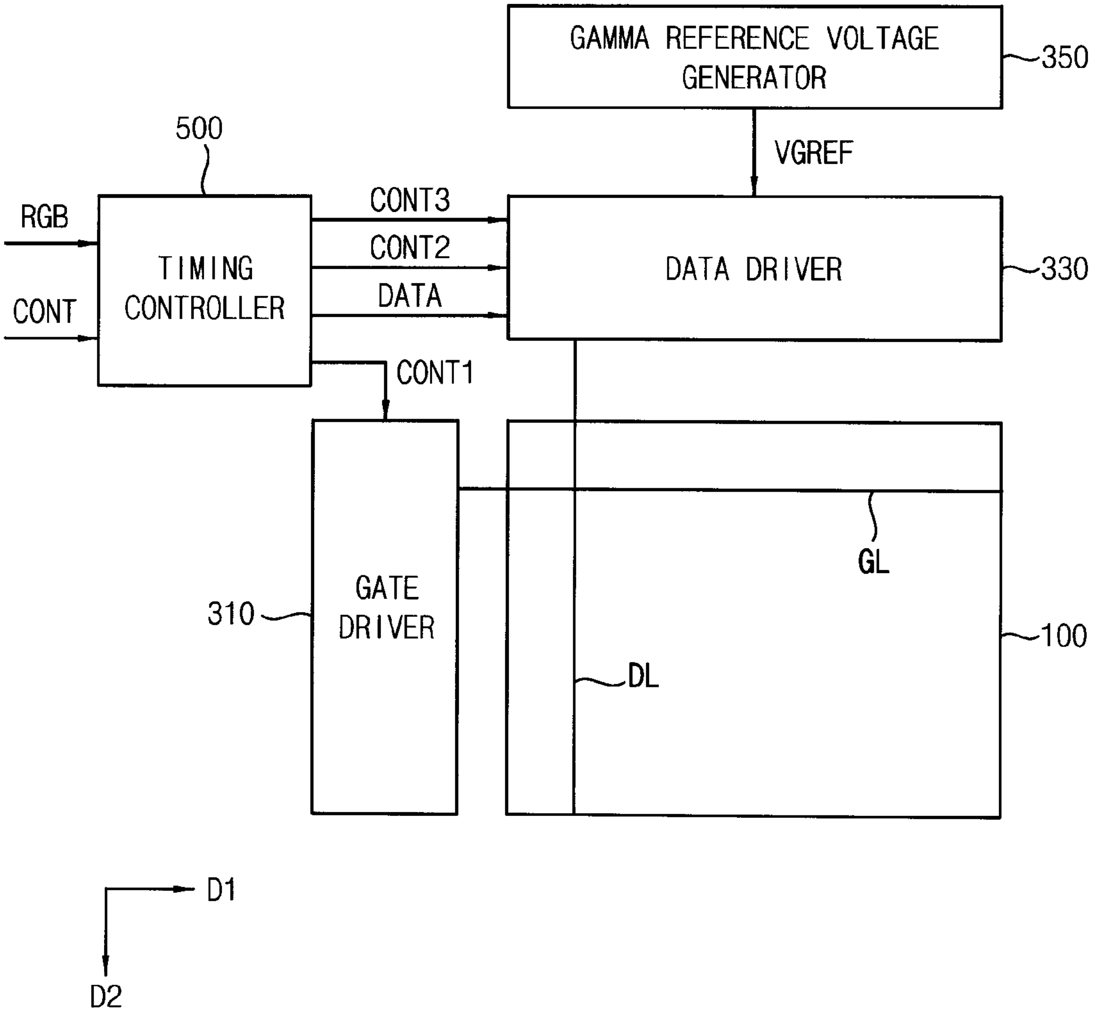
FIG. 1 is a block diagram illustrating an exemplary embodiment of a display apparatus in accordance with the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being “on” another element, it can be directly on the other element or intervening elements may be therebetween. In contrast, when an element is referred to as being “directly on” another element, there are no intervening elements present.

It will be understood that, although the terms “first,” “second,” “third” etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, “a first element,” “component,” “region,” “layer” or “section” discussed below could be termed a second element, component, region, layer or section without departing from the teachings herein.

The terminology used herein is for the purpose of describing particular embodiments only and is not intended to be limiting. As used herein, the singular forms “a,” “an,” and “the” are intended to include the plural forms, including “at least one,” unless the content clearly indicates otherwise. “Or” means “and/or.” As used herein, the term “and/or” includes any and all combinations of one or more of the associated listed items. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as “lower” or “bottom” and “upper” or “top,” may be used herein to describe one element’s relationship to another element as illustrated in the Figures. It will be understood that relative terms are intended to encompass different orientations of the device in addition to the orientation depicted in the Figures. For example, if the device in one of the figures is turned over, elements described as being on the “lower” side of other elements would then be oriented on “upper” sides of the other elements. The exemplary term “lower,” can therefore, encompasses both an orientation of “lower” and “upper,” depending on the particular orientation of the figure. Similarly, if the device in one of the figures is turned over, elements described as “below” or “beneath” other elements would then be oriented “above” the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, the invention will be explained in detail with reference to the accompanying drawings.

Figure 2:
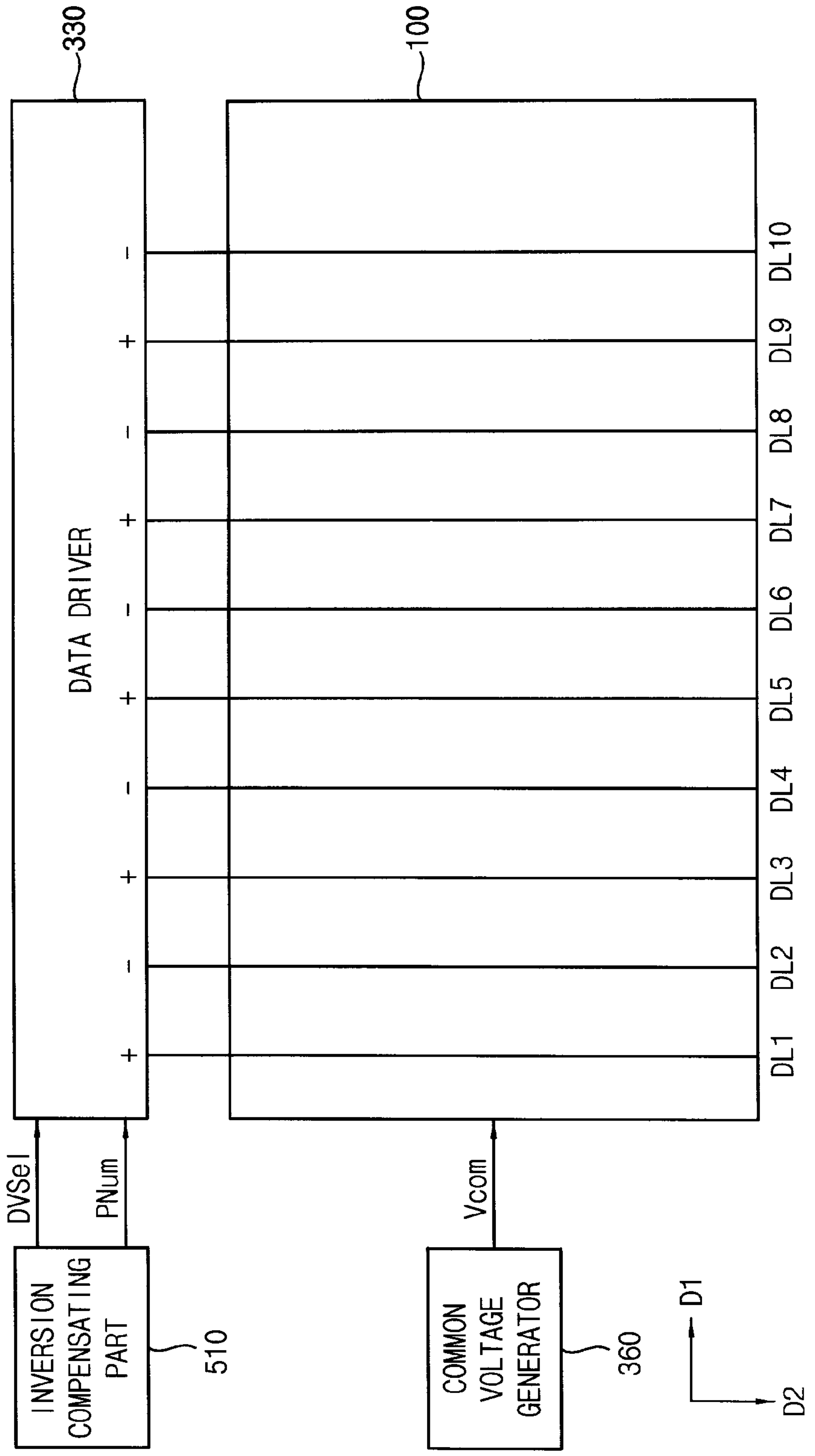
FIG. 2 is a schematic diagram illustrating an exemplary embodiment of a data driver and a display panel in FIG. 1.

FIG. 1 is a block diagram illustrating an exemplary embodiment of a display apparatus in accordance with the invention. FIG. 2 is a schematic diagram illustrating a data driver and a display panel in FIG. 1.

Referring to FIGS. 1 and 2, an exemplary embodiment of the display apparatus includes a display panel 100, a gate driver 310, a data driver 330, a gamma reference voltage generator 360 and a timing controller 500.

The display panel 100 displays an image. The display panel 100 may include a first substrate, a second substrate disposed opposite to, e.g., facing, the first substrate and a liquid crystal layer disposed between the first and second substrates.

The display panel 100 includes a plurality of pixels. The pixels may include a red pixel, a green pixel and a blue pixel.

The display panel 100 includes a plurality of gate lines GL and a plurality of data lines DL. The pixels are connected to the gate lines GL and the data lines DL, respectively. The gate lines GL extend substantially in a first direction D1, and are arranged in a second direction D2, which may be substantially perpendicular to the first direction D1. The data lines DL extend substantially in the second direction D2 crossing the first direction D1, and are arranged in the first direction D1.

Each pixel includes a switching element and a liquid crystal capacitor electrically connected to the switching element. The pixel may further include a storage capacitor. The pixels are disposed substantially in a matrix form. The switching element may be a thin film transistor.

The gate lines GL, the data lines DL, the pixel electrodes and the storage electrodes may be disposed on the first substrate. A common electrode may be disposed on the second substrate. The common electrode may receive a common voltage Vcom from the common voltage generator 360.

The timing controller 500 receives input image data RGB and an input control signal CONT from an external apparatus. The input image data RGB may include red image data R, green image data G and blue image data B. The input control signal CONT may include a master clock signal, a data enable signal, a vertical synchronizing signal and a horizontal synchronizing signal.

The timing controller 500 generates a first control signal CONT1, a second control signal CONT2, a data signal DATA and an inversion compensating signal CONT3 based on the input image data RGB and the input control signal CONT.

The timing controller 500 generates the first control signal CONT1 to control a driving timing of the gate driver 310 based on the input control signal CONT, and outputs the first control signal CONT1 to the gate driver 310. The first control signal CONT1 may include a vertical start signal and a gate clock signal.

The timing controller 500 generates the second control signal CONT2 to control a driving timing of the data driver 330 based on the input control signal CONT, and outputs the second control signal CONT2 to the data driver 330. The second control signal CONT2 may include a horizontal start signal and a load signal.

The timing controller 500 includes an inversion compensating part 510.

The inversion compensating part 510 generates the inversion compensating signal CONT3 to control a polarity ratio of the data driver 330 based on the input control signal CONT, and outputs the inversion compensating signal CONT3 to the data driver 330. The inversion compensating signal CONT3 may include a data voltage selection signal DVSel and a polarity ratio signal PNum.

The timing controller 500 generates the data signal DATA based on the input image data RGB, and outputs the data signal DATA to the data driver 330.

The gate driver 310 receives the first control signal CONT1 from the timing controller 500. The gate driver 310 generates gate signals for driving the gate lines GL in response to the first control signal CONT1. The gate driver 310 sequentially outputs the gate signals to the gate lines GL.

The gamma reference voltage generator 350 generates a gamma reference voltage VGREF. The gamma reference voltage generator 350 provides the gamma reference voltage VGREF to the data driver 330. The gamma reference voltages VGREF have values (e.g., voltage levels) corresponding to the data signal DATA. In an exemplary embodiment, the gamma reference voltage generator 350 may be disposed in the data driver 330.

The data driver 330 receives the second control signal CONT2, the inversion compensating signal CONT3 and the data signal DATA from the timing controller 500. The data driver 330 receives the gamma reference voltage VGREF from the gamma reference voltage generator 350.

The data driver 330 converts the data signal DATA into data voltages of analog type using the gamma reference voltage VGREF. The data driver 330 outputs the data voltages to the data lines DL.

In an exemplary embodiment, the data driver 330 may be driven in a column inversion method. Alternatively, the data driver 330 may be driven in a dot inversion method. The data driver 330 may output the data voltage which has a polarity opposite to a polarity of a data voltage applied to the adjacent data lines DL. Accordingly, in such an embodiment, the data voltages having different polarities, such as in a sequence of "+, −, +, −, +," for example, are applied to each pixel column.

The data voltages may have a first data voltage and a second data voltage. The first data voltage may have a positive polarity with respect to the common voltage during odd numbered frames and a negative polarity with respect to the common voltage during even numbered frames. The second data voltage may have the negative polarity with respect to the common voltage during the odd numbered frames and the positive polarity with respect to the common voltage during the even numbered frames.

FIG. 2 shows the data lines including first to tenth data lines DL1 to DL10, for convenience of illustration and description, but the invention is not limited thereto.

The data driver 330 may alternately output the first and second data voltages to the data lines. In one exemplary embodiment, for example, the first data line DL1 may receive the first data voltage, the second data line DL2 may receive the second data voltage, and the third data line DL3 may receive the first data voltage.

In an exemplary embodiment, the data driver 330 may control the number of the data lines that receive the first data voltage and the number of the data lines that receive the second data voltage. In such an embodiment, the data driver 330 may control the number of the data lines that receive the first data voltage and the number of the data lines that receive the second data voltage based on the data voltage selection signal DVSel and the polarity ratio signal PNum.

In an exemplary embodiment, the inversion compensating part 510 generates the inversion compensating signal CONT3 to control the polarity ratio of the data driver 330 based on the input control signal CONT. Here, the polarity ratio of the data driver 330 means the ratio between the number of the data lines that receive the first data voltage and the number of the data lines that receive the second data voltage, which is controlled by the data driver 330.

In one exemplary embodiment, for example, when the polarity ratio of the data driver 330 is set to 4:6 and the polarity ratio of a previous frame is not 4:6 (e.g., less than or greater than 4:6), the inversion compensating part 510 may generate the inversion compensating signal CONT3 to control the data driver 330 to output the first data voltage and the second data voltage to the data lines in ratio of 4:6, and the inversion compensating part 510 may output the inversion compensating signal CONT3 to the data driver 330.

In such an embodiment, when the polarity ratio of the data driver 330 is set to 4:6 and the polarity ratio of the previous frame is 4:6, the inversion compensating part 510 may not generate the inversion compensating signal CONT3. In an alternative exemplary embodiment, when the polarity ratio of the data driver 330 is set to 4:6 and the polarity ratio of the previous frame is 4:6, the inversion compensating part 510 may generate the inversion compensating signal CONT3 to maintain the polarity ratio and may output the inversion compensating signal CONT3 to the data driver 330.

The data voltage selection signal DVSel may select one of the first data voltage and the second data voltage. The polarity ratio signal PNum may have information on the number of the data lines, a data voltage of which is switched between the first data voltage and the second data voltage, that is, switched from one of the first data voltage and the second data voltage to the other of the first data voltage and the second data voltage.

In one exemplary embodiment, for example, when the data voltage selection signal DVSel selects the first data voltage and the polarity ratio signal PNum has a value corresponding to M (here, M is a natural number), the data driver 330 may be driven to increase the number of the data lines that receive the first data voltage by M such that the data driver 330 may output the first data voltage instead of the second data voltage to M data lines that receive the second data voltage in the previous frame. Accordingly, the number of the data lines that receive the first data voltage is increased by M and the number of the data lines that receive the second data voltage is decreased by M. A sum of the number of the data lines that receive the first data voltage and the number of the data lines that receive the second data voltage may have a constant value. The constant value may be the number of total data lines.

The data driver 330 may switch the data voltage between the first data voltage and the second data voltage in a predetermined order, e.g., in the order of arrangement of the data lines. The data driver 330 may sequentially switch the data voltage of the data lines between the first data voltage and the second data voltage along the first direction.

In one exemplary embodiment, for example, when the data voltage selection signal DVSel selects the first data voltage and the polarity ratio signal PNum has the value of M, the data driver 330 may select M data lines that receive the second data voltage in the previous frame along the first direction, and may output the first data voltage to the M data lines.

In an alternative exemplary embodiment, the data driver 330 may switch the data voltage between the first data voltage and the second data voltage in a random order. The data driver 330 may non-sequentially switch the first data voltage and the second data voltage.

In one exemplary embodiment, for example, when the data voltage selection signal DVSel selects the first data voltage and the polarity ratio signal PNum has M, the data driver 330 may select M data lines which is receives the second data voltage in a random order and may output the first data voltage to the M data lines.

Figure 3:
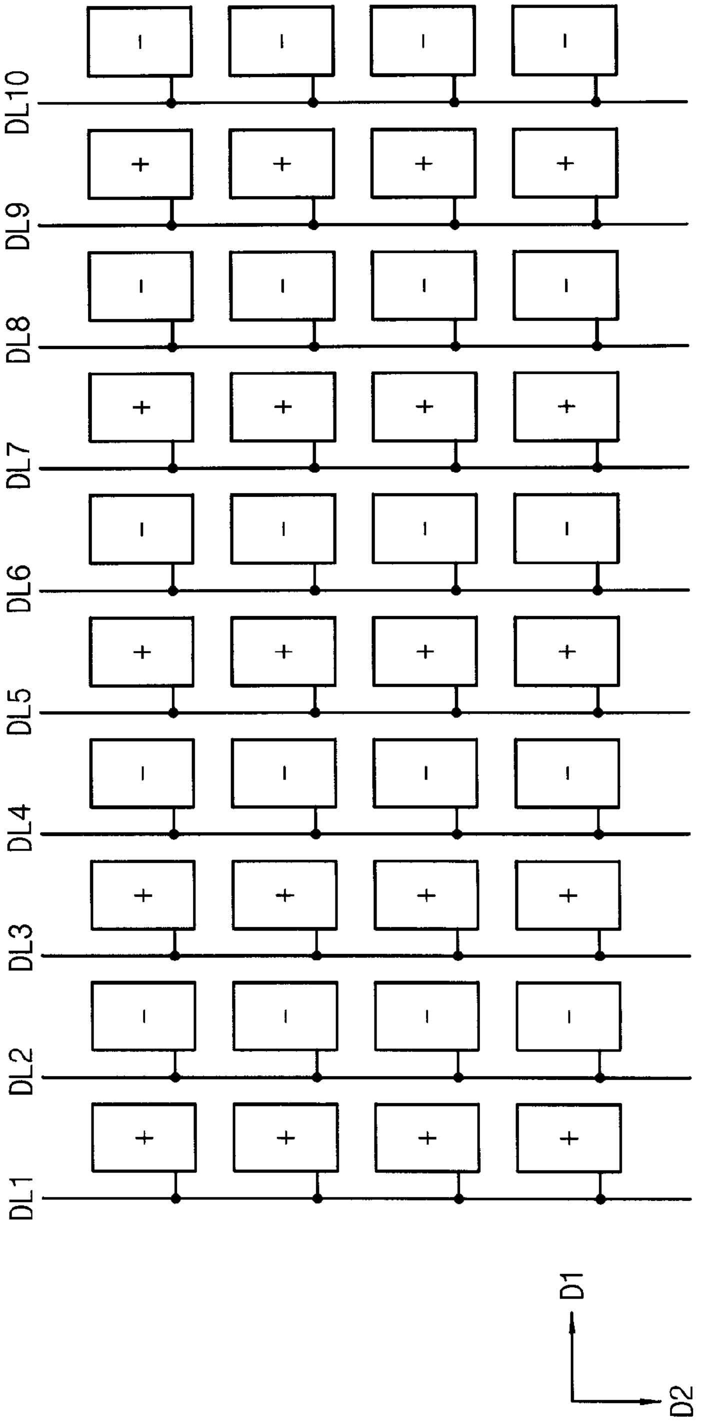
FIG. 3 is a schematic diagram illustrating pixels and data lines in FIG. 2.

FIG. 3 is a schematic diagram illustrating pixels and data lines in FIG. 2.

Referring to FIGS. 2 and 3, the display panel may include the pixels, which are disposed substantially in a matrix form including a plurality of pixel rows and a plurality of pixel columns. The pixels may be electrically connected to the data lines DL.

In an exemplary embodiment, as shown in FIG. 3, the data lines DL may be disposed between the adjacent pixel columns. The data lines DL may be electrically connected to the pixels in the adjacent pixel column in the first direction, e.g., the adjacent pixel column on the right side. In an alternative exemplary embodiment, the data lines DL may be electrically connected alternately to the pixels in adjacent pixel columns, e.g., the adjacent pixel columns on the left and right sides.

FIGS. 2 and 3 show a driving state during an odd frame when the polarity ratio signal PNum has a value of zero (0).

In an exemplary embodiment, the first data line DL1 is electrically connected to a first pixel column and outputs the first data voltage (e.g., a positive voltage) to the first pixel column. The second data line DL2 is electrically connected to a second pixel column and outputs the second data voltage (e.g., a negative voltage) to the second pixel column. The third data line DL3 is electrically connected to a third pixel column and outputs the first data voltage to the third pixel column. The fourth data line DL4 is electrically connected to a fourth pixel column and outputs the second data voltage to the fourth pixel column. Each of the remaining data lines DL is electrically connected to a corresponding pixel column and output the first data voltage or the second data voltage in the same way as described above.

In such an embodiment, when the polarity ratio signal PNum has a value of zero (0), the polarity ratio of the number of the data lines that receive the first data voltage to the number of the data lines that receive the second data voltage is 1:1.

Figure 4:
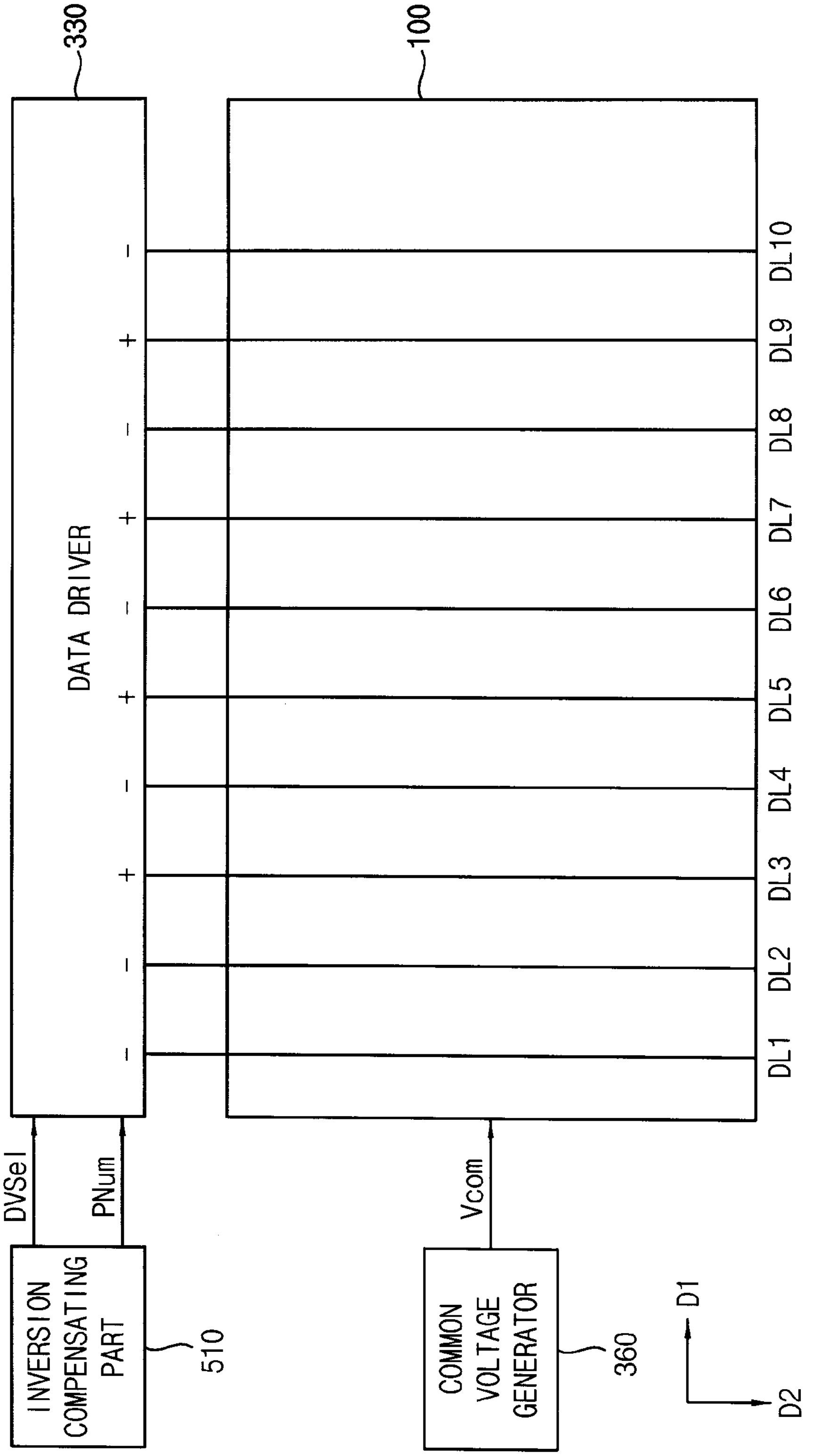
FIG. 4 is a schematic diagram illustrating an exemplary embodiment of a data driver and a display panel in FIG. 1.
Figure 5:
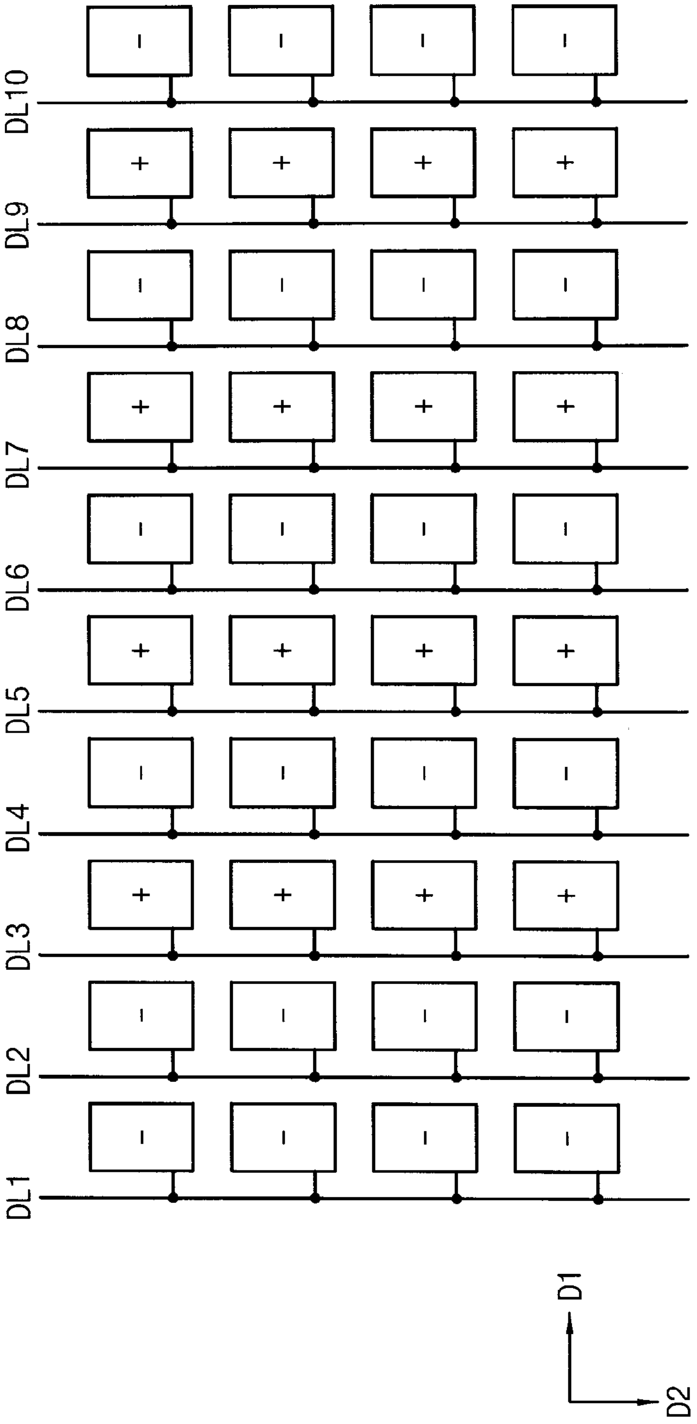
FIG. 5 is a schematic diagram illustrating pixels and data lines in FIG. 4.

FIG. 4 is a schematic diagram illustrating an exemplary embodiment of a data driver and a display panel in FIG. 1. FIG. 5 is a schematic diagram illustrating pixels and data lines in FIG. 4.

FIGS. 4 and 5 show a driving state during an odd frame when the data voltage selection signal DVSel selects the second data voltage and the polarity ratio signal PNum has a value of 1.

Referring to FIGS. 4 and 5, the data driver 330 may switch the data voltage between the first data voltage and the second data voltage in the order of the arrangement of the data lines. The data driver 330 may sequentially switch the first data voltage and the second data voltage along the first direction.

The data driver 330 may output the second data voltage instead of the first data voltage to the first data line DL1. Remaining data lines DL2 to DL10 may receive the first data voltage and the second data voltage as in the driving state shown in FIG. 2. Thus, the number of data lines that receive the second data voltage is increased by 1 and the number of data lines that receive the first data voltage is decreased by 1. Accordingly, the polarity ratio becomes 4:6.

Figure 6:
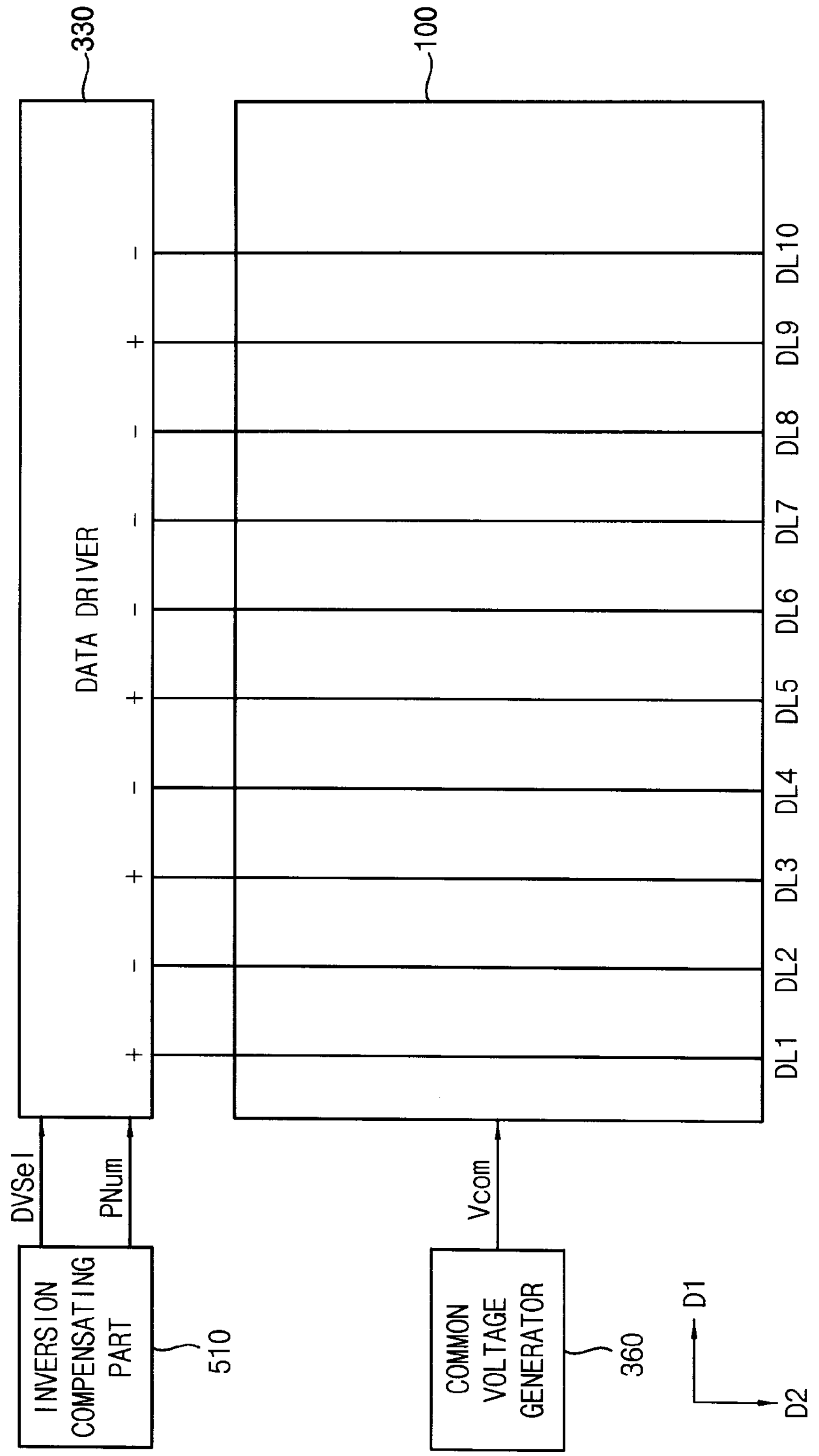
FIG. 6 is a schematic diagram illustrating an exemplary embodiment of a data driver and a display panel in FIG. 1.
Figure 7:
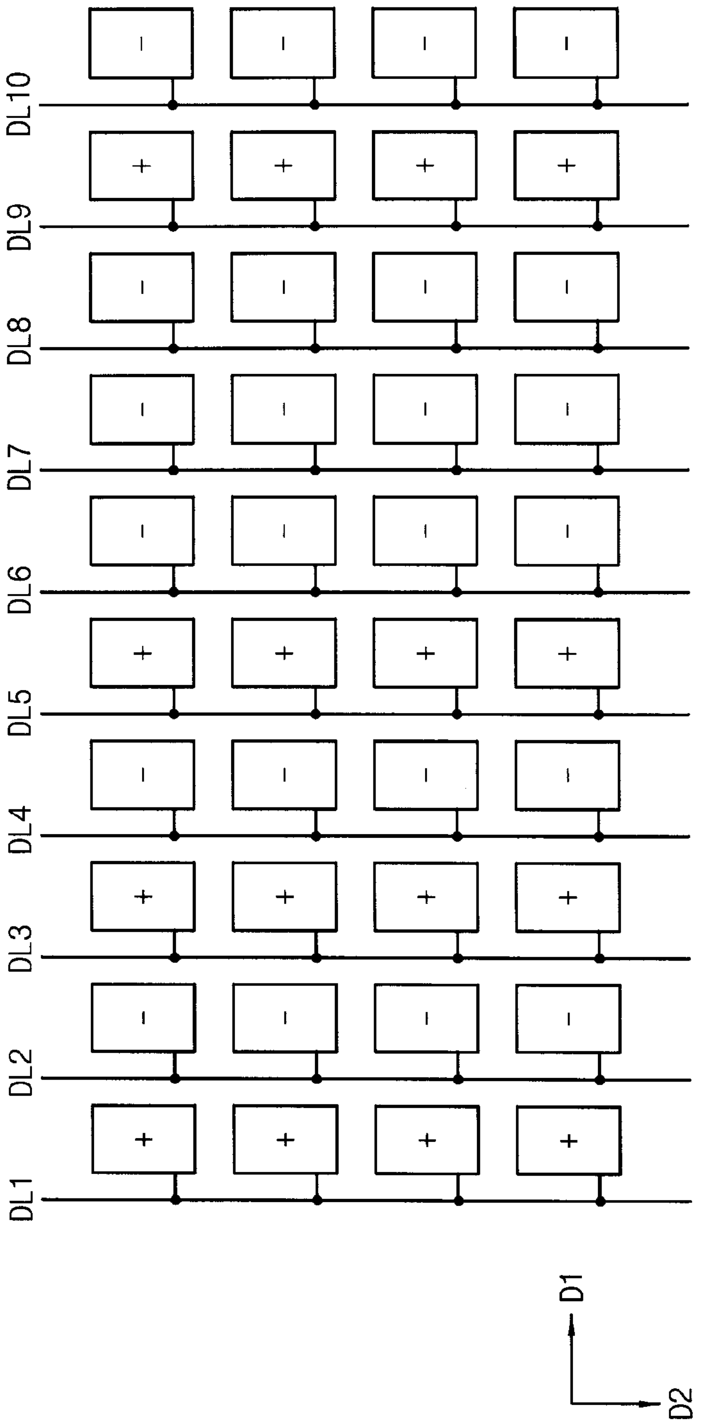
FIG. 7 is a schematic diagram illustrating pixels and data lines in FIG. 6.

FIG. 6 is a schematic diagram illustrating an exemplary embodiment of a data driver and a display panel in FIG. 1. FIG. 7 is a schematic diagram illustrating pixels and data lines in FIG. 6.

FIGS. 6 and 7 show a driving state during an odd frame when the data voltage selection signal DVSel selects the second data voltage and the polarity ratio signal PNum has a value of 1.

Referring to FIGS. 6 and 7, the data driver 330 may switch the data voltage between the first data voltage and the second data voltage in a random order. The data driver 330 may non-sequentially switch the first data voltage and the second data voltage.

The data driver 330 may randomly select one data line of the data lines that receive the first data voltage in the previous frame, e.g., the seventh data line DL7 and may output the second data voltage instead of the first data voltage to the selected one data line, e.g., the seventh data line DL7. Remaining data lines DL1 to DL6 and DL8 to DL10 may receive the first data voltage and the second data voltage in the same way as in the driving state shown in FIG. 2. Thus, the number of data lines which receive the second data voltage is increased by 1 and the number of data lines which receive the first data voltage is decreased by 1. Accordingly, the polarity ratio becomes 4:6.

Figure 8:
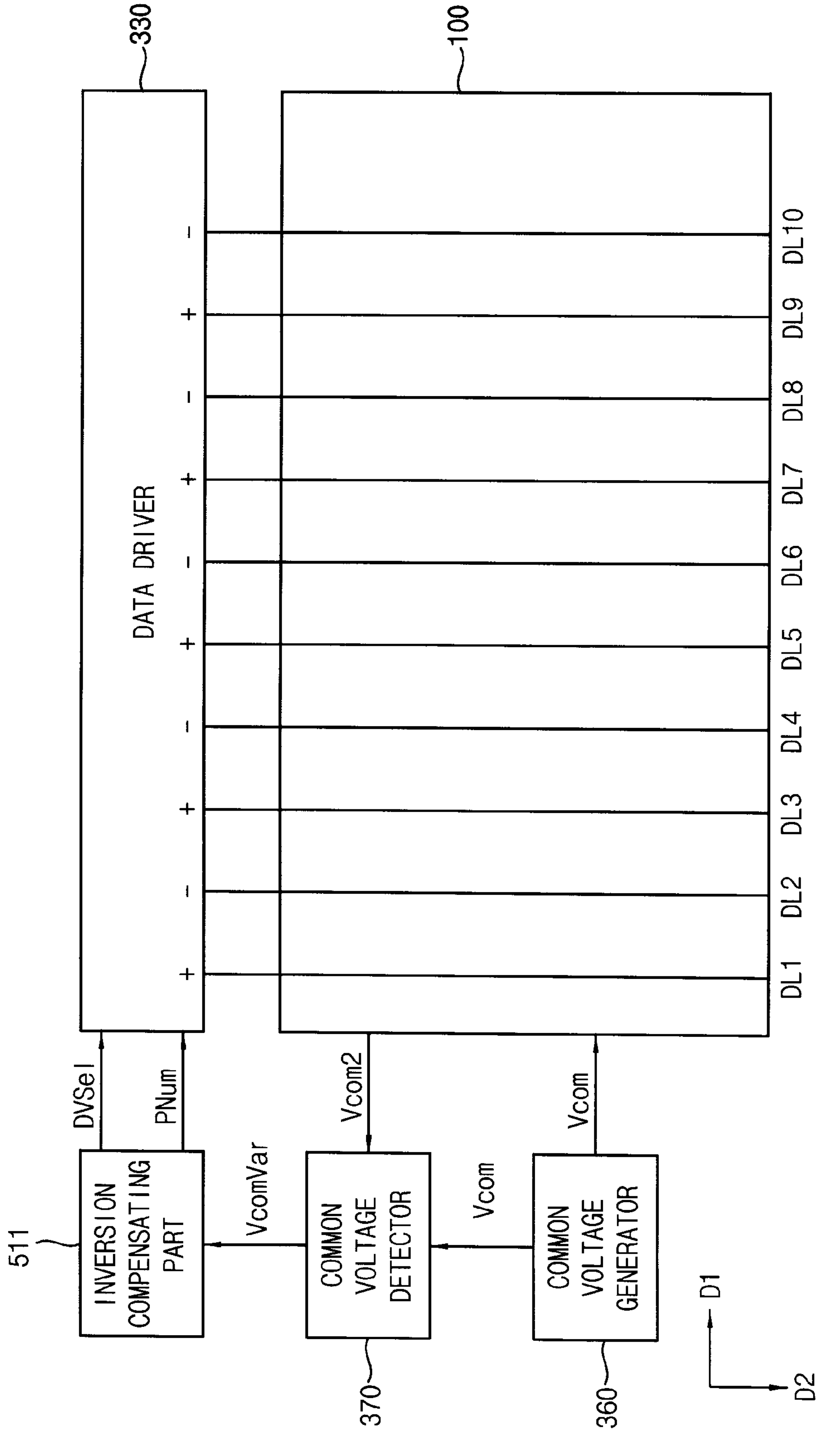
FIG. 8 is a schematic diagram illustrating an alternative exemplary embodiment of a data driver and a display panel in accordance with the invention.

FIG. 8 is a schematic diagram illustrating another exemplary embodiment of a data driver and a display panel in accordance with the invention.

The display apparatus shown in FIG. 8 is substantially the same as the display apparatus in FIGS. 1 to 7 except for an inversion compensating part 511 and a common voltage detector 370. Thus, the same reference numerals will be used to refer to same or like elements as those described in with reference to FIGS. 1 to 7, and any repetitive detained description thereof will hereinafter be omitted.

Referring to FIGS. 1 and 8, the display apparatus includes a display panel 100, a gate driver 310, a data driver 330, a gamma reference voltage generator 350, a timing controller 500, a common voltage generator 360 and a common voltage detector 370.

The common voltage detector 370 may detect a variation (e.g., an amount of the variation) of a common voltage applied to the common electrode of the display panel 100 and may output a common voltage variation VcomVar. The common voltage variation VcomVar may be obtained by subtracting the common voltage Vcom from a second common voltage Vcom2. The common voltage Vcom may be a common voltage generated from the common voltage generator 360 and the second common voltage Vcom2 may be a common voltage measured at the common electrode of the display panel 100.

The timing controller 500 may include an inversion compensating part 511. The inversion compensating part 511 may generate the inversion compensating signal CONT3 to control a polarity ratio of the data driver 330 based on the input control signal CONT and the common voltage variation VcomVar, and outputs the inversion compensating signal CONT3 to the data driver 330. The inversion compensating signal CONT3 may include a data voltage selection signal DVSel and a polarity ratio signal PNum.

When the common voltage variation VcomVar has the negative polarity during odd numbered frame and the positive polarity during even numbered frame, the data voltage selection signal DVSel selects the first data voltage and the polarity ratio signal PNum has a value corresponding to an amount (e.g., an absolute value) of the common voltage variation VcomVar.

When the common voltage variation VcomVar has the positive polarity during odd numbered frame and the negative polarity during even numbered frame, the data voltage selection signal DVSel selects the second data voltage and the polarity ratio signal PNum has a value corresponding to an amount of the common voltage variation VcomVar.

In an alternative exemplary embodiment, the inversion compensating part 511 may output the inversion compensating signal CONT3 to the data driver 330 when the common voltage variation VcomVar is greater than a predetermined threshold.

According to one or more exemplary embodiments as set forth herein, a positive noise due to a positive polarity and a negative noise due to a negative polarity may be cancelled each other out by controlling the number of data lines that receive the first data voltage and the second data voltage. Thus, a ripple noise which occurs in a common voltage is decreased, and the display quality of the display apparatus may be improved.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display apparatus comprising:

a display panel comprising:

a plurality of data lines arranged in a first direction, wherein the data line extends substantially in a second direction; and a plurality of pixels electrically connected to the data lines; and a data driver configured to output a first data voltage and a second data voltage to the data lines and which controls a ratio between the number of the data lines which receives the first data voltage and the number of the data lines which receive the second data voltage; and an inversion compensating part configured to output an inversion compensating signal to control a ratio between the number of the data lines which receive the first data voltage and the number of the data lines which receive the second data voltage, wherein the first data voltage has a positive polarity during a first frame and a negative polarity during a second frame, the second data voltage has the negative polarity during the first frame and the positive polarity during the second frame, and wherein the data driver outputs alternately the first data voltage and the second data voltage to the data lines, and controls the number of the data lines which receive the first data voltage and the number of the data lines which receive the second data voltage based on the inversion compensating signal.

2. The display apparatus of claim 1, wherein the inversion compensating signal comprises a data voltage selection signal and a polarity ratio signal, the data voltage selection signal selects one of the first data voltage and the second data voltage, and the polarity ratio signal has a value corresponding to the number of the data lines, a data voltage of which is switched between the first data voltage and the second data voltage.

3. The display apparatus of claim 2, wherein when the data voltage selection signal selects the first data voltage, the data driver decreases the number of the data lines which receive the second data voltage by the value of the polarity ratio signal and increases the number of the data lines which receive the first data voltage by the value of the polarity ratio signal, and when the data voltage selection signal selects the second data voltage, the data driver decreases the number of the data lines which receive the first data voltage by the value of the polarity ratio signal and increases the number of the data lines which receive the second data voltage by the value of the polarity ratio signal.

4. The display apparatus of claim 3, wherein the data driver sequentially switches the first data voltage and the second data voltage therebetween, along the first direction.

5. The display apparatus of claim 3, wherein the data driver non-sequentially switches the first data voltage and the second data voltage therebetween.

6. The display apparatus of claim 1, further comprising:

a common voltage generator configured to output a common voltage to the display panel; and a common voltage detector configured to output a variation of the common voltage, wherein the inversion compensating part outputs the inversion compensating signal to the data driver based on the variation of the common voltage.

7. The display apparatus of claim 6, wherein the inversion compensating signal comprises a data voltage selection signal and a polarity ratio signal, when the variation of the common voltage has the negative polarity during the first frame and the positive polarity during the second frame, the data voltage selection signal selects the first data voltage, when the variation of the common voltage has the positive polarity during the first frame and the negative polarity during the second frame, the data voltage selection signal selects the second data voltage, and the polarity ratio signal has a value corresponding to the number of the data lines, a data voltage of which is switched between the first data voltage and the second data voltage, based on the variation of the common voltage.

8. The display apparatus of claim 6, wherein the inversion compensating part outputs the inversion compensating signal to the data driver when the variation of the common voltage is greater than a predetermined threshold.

9. A method of driving a display apparatus, the method comprising:

outputting a first data voltage and a second data voltage to data lines of the display apparatus using a data driver of the display apparatus, wherein the second data voltage has a polarity opposite to a polarity of the first data voltage;

generating a data voltage selection signal which selects one of the first data voltage and the second data voltage;

generating a polarity ratio signal having a value corresponding to the number of data lines, a data voltage of which is switched between the first data voltage and the second data voltage; and controlling a ratio between the number of the data lines which receive the first data voltage and the number of the data lines which receive the second data voltage based on the data voltage selection signal and the polarity ratio signal, wherein the first data voltage has a positive polarity during a first frame and a negative polarity during a second frame, and the second data voltage has the negative polarity during the first frame and the positive polarity during the second frame, and wherein when the data voltage selection signal selects the first data voltage, the data driver decreases the number of the data lines which receive the second data voltage by the value of the polarity ratio signal and increases the number of the data lines which receive the first data voltage by the value of the polarity ratio signal, and when the data voltage selection signal selects the second data voltage, the data driver decreases the number of the data lines which receive the first data voltage by the value of the polarity ratio signal and increases the number of the data lines which receive the second data voltage by the value of the polarity ratio signal.

10. The method of claim 9, wherein the data driver sequentially switches the first data voltage and the second data voltage along a direction in which the data lines are arranged.

11. The method of claim 9, wherein the data driver non-sequentially switches the first data voltage and the second data voltage along the direction in which the data lines are arranged.

12. A method of driving a display apparatus, the method comprising:

outputting a first data voltage and a second data voltage to data lines of the display apparatus using a data driver of the display apparatus, wherein the second data voltage has a polarity opposite to a polarity of the first data voltage;

generating a data voltage selection signal which selects one of the first data voltage and the second data voltage;

generating a polarity ratio signal having a value corresponding to the number of data lines, a data voltage of which is switched between the first data voltage and the second data voltage;

controlling a ratio between the number of the data lines which receive the first data voltage and the number of the data lines which receive the second data voltage based on the data voltage selection signal and the polarity ratio signal; and outputting a variation of a common voltage, wherein the common voltage is applied to a display panel of the display apparatus, wherein the first data voltage has a positive polarity during a first frame and a negative polarity during a second frame, and the second data voltage has the negative polarity during the first frame and the positive polarity during the second frame, wherein the data voltage selection signal and the polarity ratio signal are generated based on the variation of the common voltage, and wherein when the variation of the common voltage has the negative polarity during the first frame and the positive polarity during the second frame, the data voltage selection signal selects the first data voltage, and when the variation of the common voltage has the positive polarity during the first frame and the negative polarity during the second frame, the data voltage selection signal selects the second data voltage.

13. A method of driving a display apparatus, the method comprising:

outputting a first data voltage and a second data voltage to data lines of the display apparatus using a data driver of the display apparatus, wherein the second data voltage has a polarity opposite to a polarity of the first data voltage;

generating a data voltage selection signal which selects one of the first data voltage and the second data voltage;

generating a polarity ratio signal having a value corresponding to the number of data lines, a data voltage of which is switched between the first data voltage and the second data voltage;

controlling a ratio between the number of the data lines which receive the first data voltage and the number of the data lines which receive the second data voltage based on the data voltage selection signal and the polarity ratio signal; and outputting a variation of a common voltage, wherein the common voltage is applied to a display panel of the display apparatus, wherein the first data voltage has a positive polarity during a first frame and a negative polarity during a second frame, and the second data voltage has the negative polarity during the first frame and the positive polarity during the second frame, wherein the data voltage selection signal and the polarity ratio signal are generated based on the variation of the common voltage, and wherein the data voltage selection signal and the polarity ratio signal are generated when the variation of the common voltage is greater than a predetermined threshold.

* * * * *